United States Patent
Nola

(10) Patent No.: US 10,695,984 B2
(45) Date of Patent: Jun. 30, 2020

(54) HOUSING FOR A FASTENER OF A VEHICLE COMPONENT

(71) Applicant: Ford Global Technologies, LLC, Dearborn, MI (US)

(72) Inventor: Gary Nola, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 15/793,114

(22) Filed: Oct. 25, 2017

(65) Prior Publication Data

US 2019/0118489 A1    Apr. 25, 2019

(51) Int. Cl.
| | |
|---|---|
| *B29C 65/44* | (2006.01) |
| *B29C 65/64* | (2006.01) |
| *B29C 65/00* | (2006.01) |
| *B29L 31/26* | (2006.01) |
| *F16B 17/00* | (2006.01) |
| *B29K 101/12* | (2006.01) |
| *F16B 37/12* | (2006.01) |
| *F16B 37/04* | (2006.01) |

(52) U.S. Cl.
CPC ............ *B29C 65/44* (2013.01); *B29C 65/645* (2013.01); *B29C 66/24221* (2013.01); *B29C 66/5344* (2013.01); *B29C 66/612* (2013.01); *B29C 66/742* (2013.01); *B29C 66/8322* (2013.01); *F16B 17/004* (2013.01); *B29C 65/64* (2013.01); *B29K 2101/12* (2013.01); *B29L 2031/26* (2013.01); *F16B 37/045* (2013.01); *F16B 37/122* (2013.01)

(58) Field of Classification Search
CPC .... B29C 65/44; B29C 65/645; B29C 66/5344
USPC .......................................................... 264/249
See application file for complete search history.

(56) References Cited

U.S. PATENT DOCUMENTS

| | | | |
|---|---|---|---|
| 4,566,750 A | 1/1986 | Umezu | |
| 4,712,809 A * | 12/1987 | Legris | B29C 65/0672 156/73.5 |
| 5,266,258 A * | 11/1993 | Martin | B29C 66/612 264/249 |
| 5,879,115 A * | 3/1999 | Medal | B29C 65/08 411/82 |
| 7,186,051 B2 | 3/2007 | Benedetti et al. | |

FOREIGN PATENT DOCUMENTS

| | | |
|---|---|---|
| EP | 0551717 A1 | 7/1993 |
| WO | 2006111221 A1 | 10/2006 |

* cited by examiner

*Primary Examiner* — Matthew J Daniels
*Assistant Examiner* — Hana C Page
(74) *Attorney, Agent, or Firm* — Geoffrey Brumbaugh; McCoy Russell LLP

(57) ABSTRACT

Methods and systems are provided for a housing for a fastener of a vehicle component. In one example, a housing for a fastener includes a central conduit adapted to receive the fastener, and a radial key extending outward from an outer surface of the housing. The radial key is first pressed against a vehicle component in an axial direction of the housing to form a first section of a channel within an interior of the vehicle component, and the key is then rotated against the interior to form an undercut, second section of the channel in a circumferential direction of the housing.

14 Claims, 6 Drawing Sheets

HOUSING FOR A FASTENER OF A VEHICLE COMPONENT

FIELD

The present description relates generally to methods and systems for a housing for a fastener of a vehicle component.

BACKGROUND/SUMMARY

Components of a motorized vehicle are often formed from a variety of different materials. Some components, such as an intake manifold of the vehicle, are often formed of a polymer material (e.g., plastic) to reduce a weight and/or cost of the components, and/or to utilize of other properties of the material, such as thermal resistance. It is often desirable to secure a position of the plastic components within the vehicle through the use of various fasteners, such as bolts. For example, bolts may be inserted through one or more openings of the intake manifold in order to secure the intake manifold to the engine.

However, a weight-bearing quality of plastic components may be decreased relative to components formed of a different material, such as metal. In some conditions, such as conditions in which a fastener inserted into a plastic component is subjected to a large amount of force relative to a weight of the plastic component, it may be difficult to retain the plastic component in its position within the vehicle. Attempts to address the issue of the decreased weight-bearing quality of plastic components include reinforcing the plastic component with one or more metal components. One example approach is shown by Martin in European Patent 0551717. Therein, a method of installing an insert in a plastic body is disclosed. The insert is formed of metal and includes a screw thread. A hole in the plastic is sealed by the insert, and the size and shape of the insert and hole are selected so that axial displacement of the insert into the hole is accompanied by softening of the plastic due to the fastener being preheated or by vibrations applied to the plastic via the insert.

However, the inventors herein have recognized potential issues with such systems. As one example, such inserts often rely on frictional forces between a surface treatment of the insert (e.g., a knurled outer surface) and the softened plastic in order to retain the insert in engagement with the plastic component during conditions in which a load is applied to the insert. Often, during conditions in which a high load is applied to such an insert, the insert may be forcibly decoupled from the plastic component, resulting in a shifting of the position of the plastic component within the vehicle. It is therefore desirable to increase the load-bearing quality of inserts for plastic components in order to more securely maintain the position of the plastic components within the vehicle.

In one example, the issues described above may be addressed by a method, comprising: inserting a housing for a fastener into a passage extending through a vehicle component while cutting a first section of a channel into the vehicle component in an axial direction of the housing with a key of the housing, the key extending radially outward from an outer surface of the housing; then, locking the housing to the vehicle component by rotating the housing within the passage. In this way, the key of the housing cuts the channel into the vehicle component and retains the position of the housing within the vehicle component.

As one example, the housing is inserted into the vehicle component in the axial direction, driving the key of the housing to carve the first section of the channel as the housing is inserted. The housing is then locked to the vehicle component by rotating the housing in a circumferential direction of the housing, driving the key to carve the second section as the housing is rotated within the vehicle component. The key may be heated prior to insertion of the housing into the vehicle component in order to melt a material of the vehicle component to form the channel. By embedding the housing in the vehicle component in the axial direction and then rotating the housing in the circumferential direction, the channel produces an undercut within an interior of the vehicle component. The key is seated in the channel and is held in position by the undercut, retaining the housing in engagement with the vehicle component and increasing the load-bearing quality of the housing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-5 are shown to scale, though other relative dimensions may be used, if desired.

DETAILED DESCRIPTION

Figure 3A:
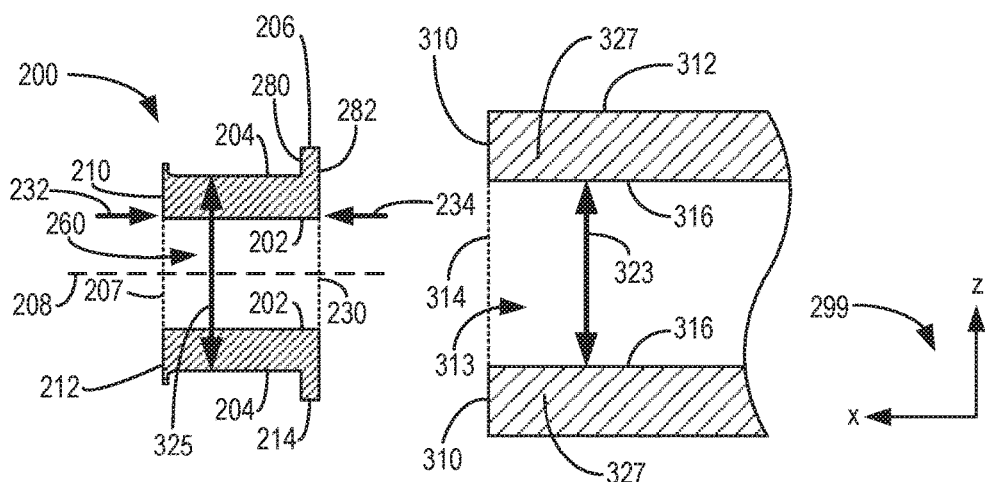
FIGS. 3A-3D show side cross-sectional views of the housing of FIGS. 2A-2B in various coupled and decoupled conditions relative to a vehicle component.
Figure 3B:
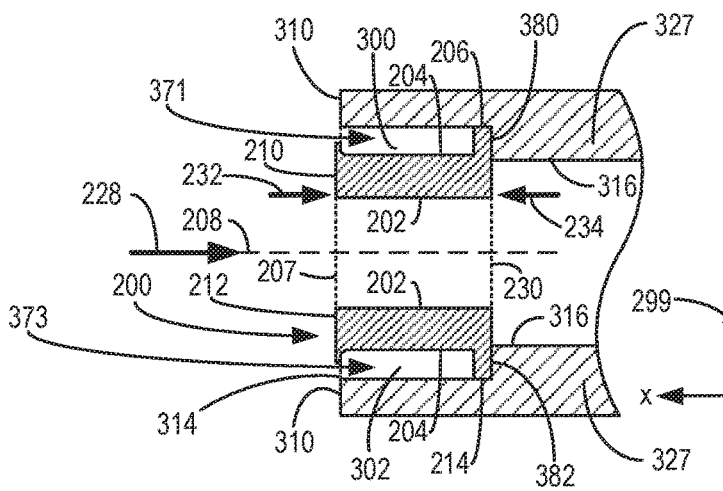
Figure 3C:
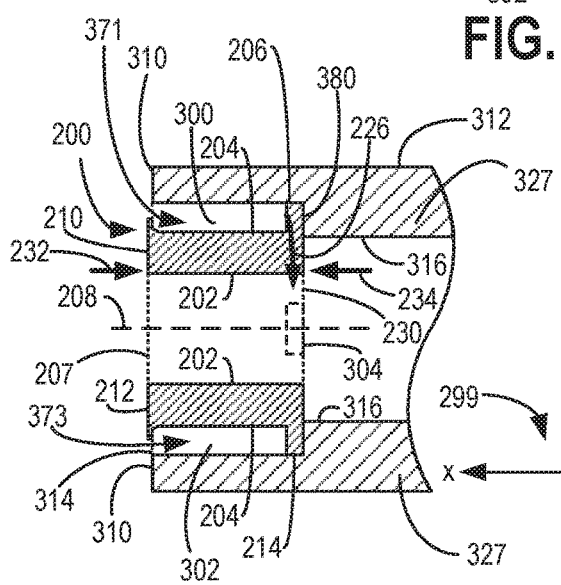
Figure 3D:
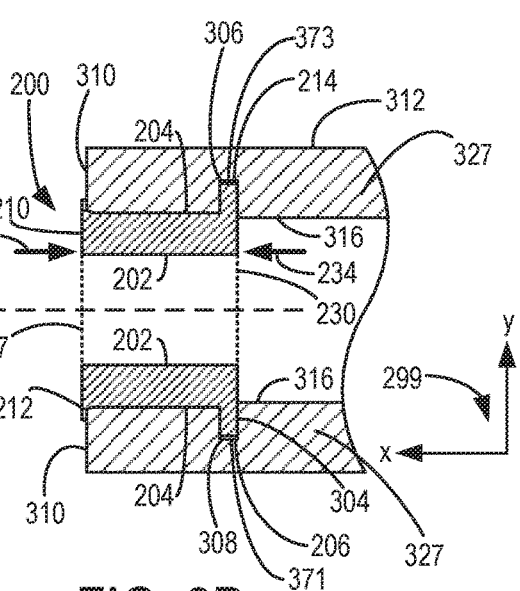
Figure 4A:
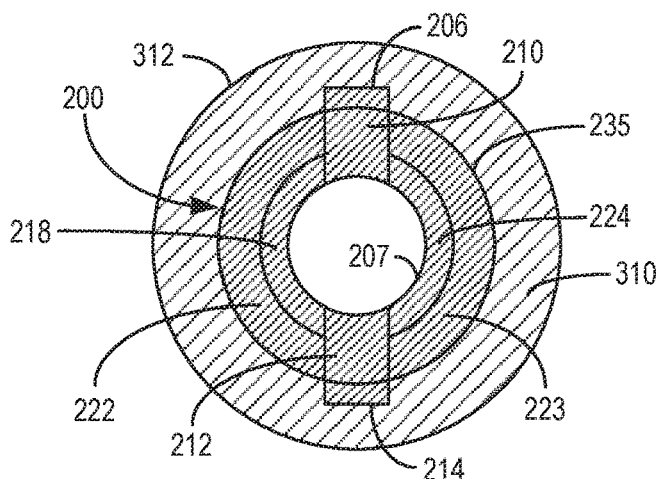
FIGS. 4A-4C show front views of the housing in various coupled and decoupled conditions relative to the vehicle component.
Figure 4B:
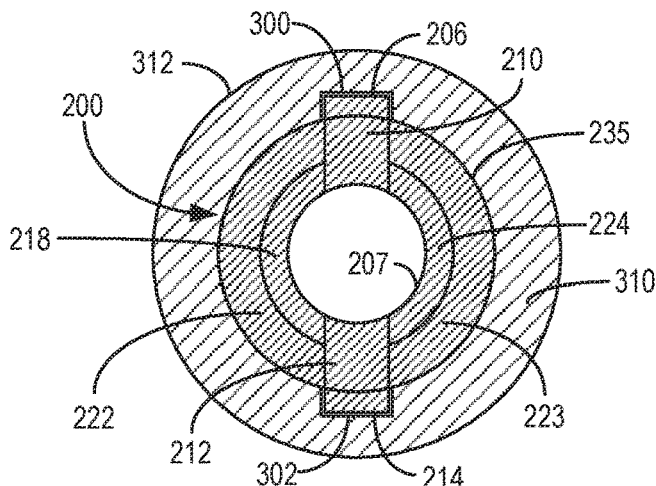
Figure 4C:
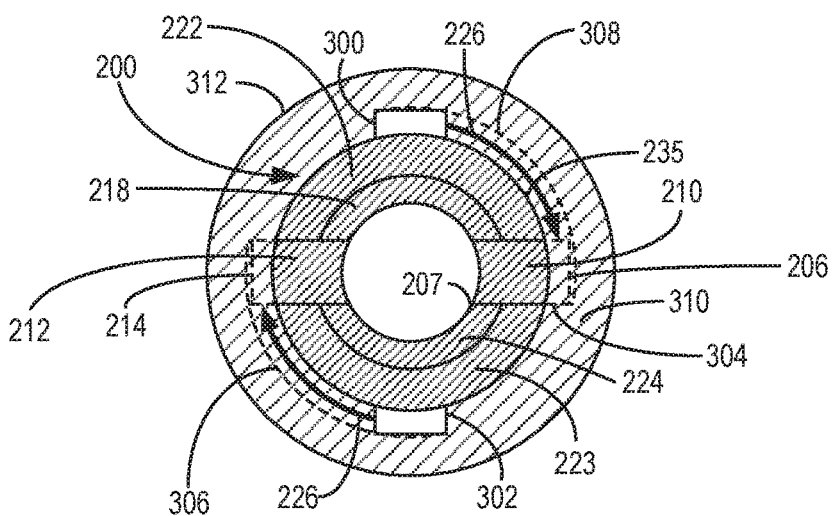
Figure 5:
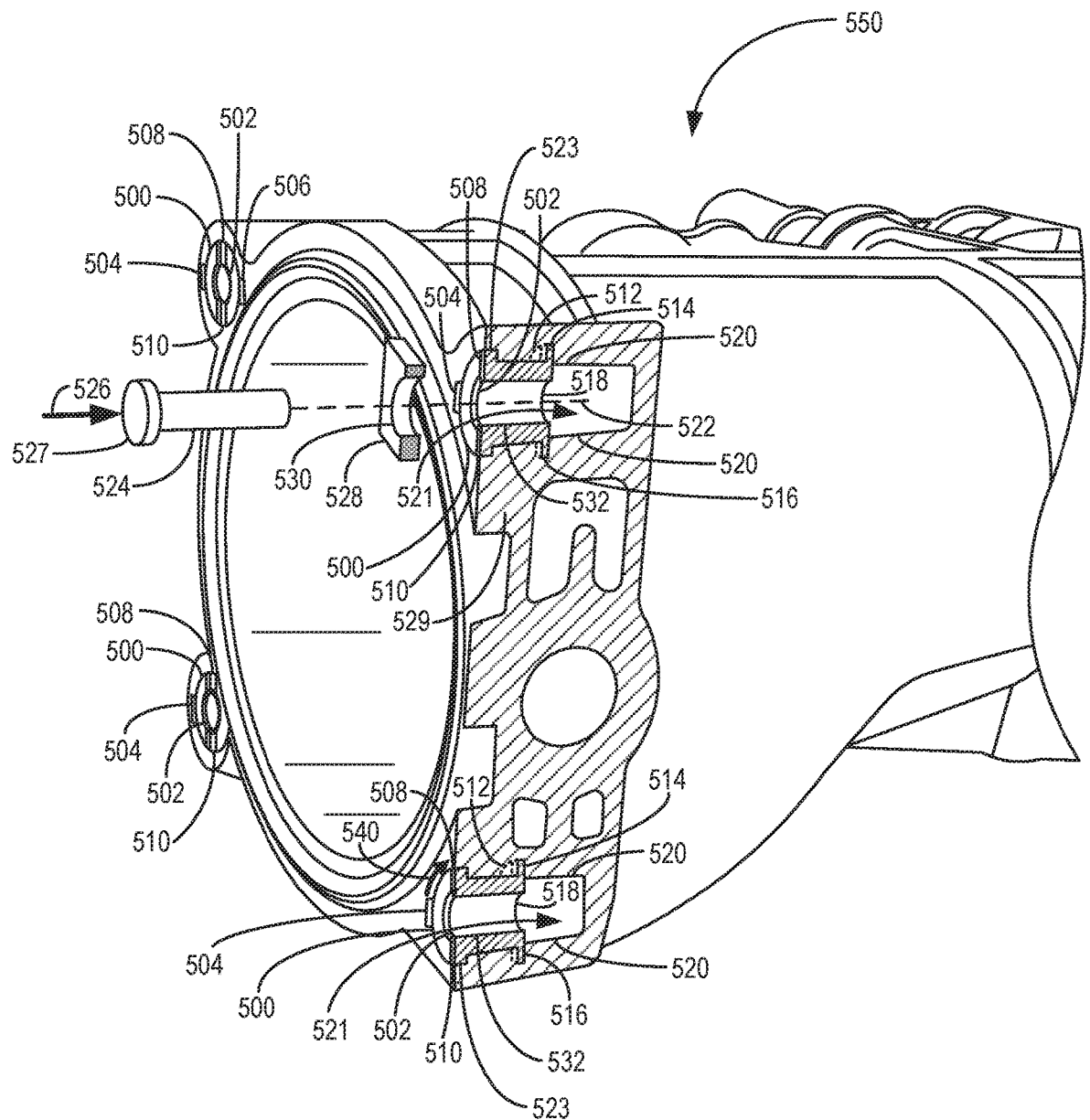
FIG. 5 shows a plurality of housings similar to the housing of FIGS. 2A-4C coupled to an intake passage of a vehicle.

The following description relates to systems and methods for a housing for a fastener of a vehicle component. A vehicle, such as the vehicle shown by FIG. 1, includes an engine and a plurality of vehicle components, such as intake passages, exhaust passages, etc. One or more of the vehicle components may be partially or entirely formed of a polymer material (e.g., plastic). The polymer vehicle component includes a housing for a fastener, such as the housing shown by FIGS. 2A-2B, embedded within the vehicle component. The housing may include a central conduit adapted to receive a fastener, such as a bolt, and may provide a reinforced interface for coupling the vehicle component to another component within the vehicle (e.g., the engine). The housing, initially decoupled from the vehicle component as shown by FIG. 3A and FIG. 4A, may be heated above a threshold temperature and inserted into a passage of the vehicle component in an axial direction of the housing, as shown by FIG. 3B. A radial key of the housing carves a first section of a channel into an interior of the vehicle component, as shown by FIG. 3B and FIG. 4B. The housing is then rotated within the vehicle component to carve a second section of the channel via the radial key of the housing, as shown by FIGS. 3C-3D and FIG. 4C. By carving the first section and second section of the channel with the radial key, the housing is locked into engagement with the vehicle component. In some examples, a plurality of housings may be coupled to the vehicle component, as shown by FIG. 5, to reinforce the vehicle component at multiple locations. In this way, the housings increase a load-bearing quality of the vehicle component, enabling a position of the vehicle component to be maintained within the vehicle. Additionally, the radial key of each housing reduces a likelihood of each housing from being decoupled from the vehicle component.

Figure 1:
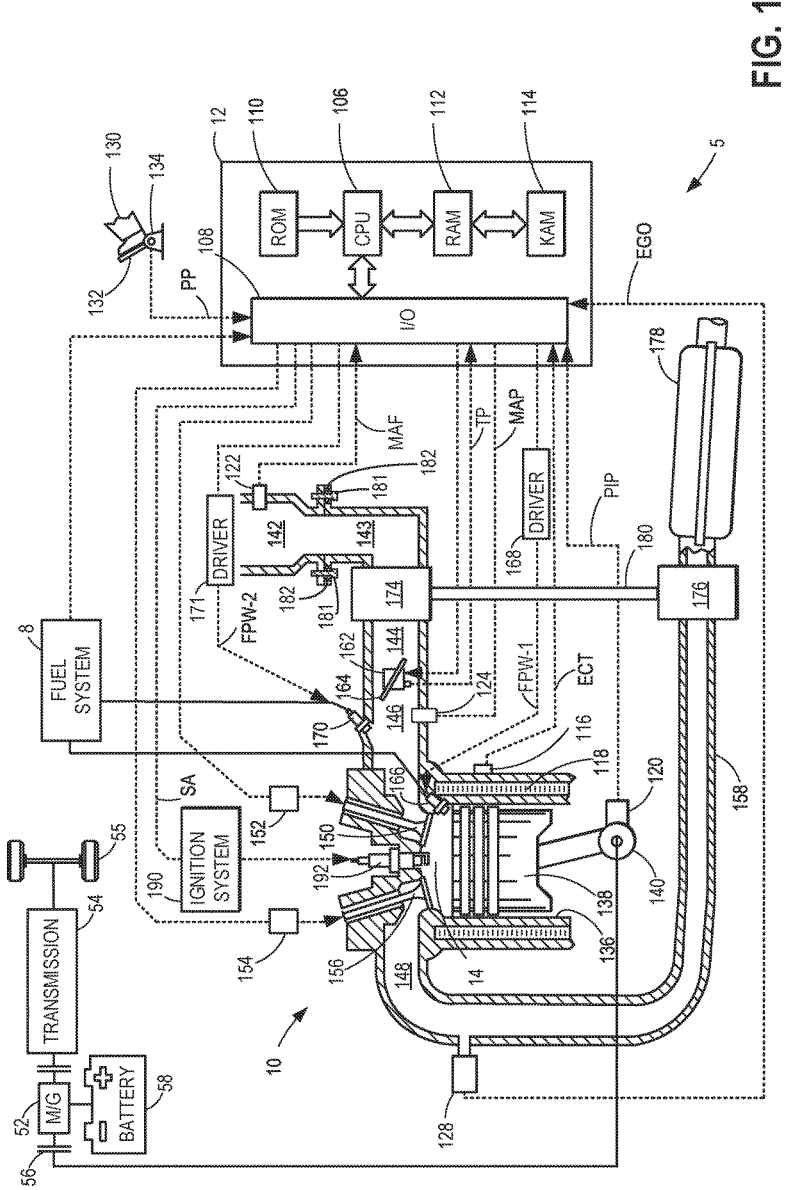
FIG. 1 schematically shows a vehicle having an engine including a combustion chamber, and an intake passage including an embedded fastener housing.

FIG. 1 depicts an example of a vehicle 5 including a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 143, 144, and 146 (which may be referred to herein as intake lines). In some examples, intake air passage 146 may be one of a plurality of passages of an intake manifold of the engine 10, with each passage of the plurality of passages being coupled to a separate cylinder of the engine 10. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

The vehicle 5 may include one or more vehicle components having one or more housings adapted to receive a fastener. For example, intake passage 142 is shown joined to intake passage 143 via a plurality of fasteners 181, with each of the fasteners 181 being coupled to a separate housing 182 embedded within the intake passage 143. Each housing 182 may include a central conduit adapted to receive one of the fasteners 181 in order to couple the intake passage 143 to the intake passage 142. Each housing 182 is permanently embedded within the intake passage 143 in order to reinforce a coupling interface between the fasteners 181 and the intake passage 143. In some examples, one or each of the intake passage 143 and intake passage 142 may be formed of a softer, first material (e.g., a polymer material, such as a thermoplastic), and each housing 182 may be formed of a harder, second material (e.g., a metal, such as steel). In other examples, the housings 182 may be formed of a different material (e.g., fiberglass) having an increased rigidity, durability, and/or hardness relative to the material of the intake passage 143 and intake passage 142 in order to reinforce the intake passage 143 and increase a durability of the coupling interface between the fasteners 181 and the intake passage 143. A melting temperature of the harder, second material may be greater than a melting temperature of the softer, first material.

In some examples, one or more of the fasteners 181 may include threaded surfaces shaped to engage with corresponding counterpart threaded surfaces of the central conduit of one or more of the housings 182. For example, the fasteners 181 may be bolts having threaded outer surfaces shaped to engage with inner threaded surfaces of the housings 182. In other examples, the fasteners 181 may not include threaded surfaces. For example, at least one of the fasteners 181 may be a non-threaded fastener such as clips, hooks, plugs, etc., with the non-threaded fastener being configured to engage with (and lock to) at least one of the housings 182. In some examples, some of the fasteners 181 may be threaded fasteners including threaded surfaces and some of the fasteners 181 may be non-threaded fasteners that do not include threaded surfaces, with the threaded fasteners configured to couple to housings 182 having inner threaded surfaces (as described above) and the non-threaded fasteners configured to couple to housings 182 that do not include inner threaded surfaces.

Although the intake passage 143 is described above as one example of a vehicle component that includes embedded housings 182 adapted to receive fasteners 181, the vehicle 5 may include one or more additional components having similar embedded housings 182. For example, a casing of the compressor 174 of the vehicle 5 may include a plurality of similar housings (e.g., similar to housings 182) adapted to receive fasteners (e.g., similar to fasteners 181) in order to couple the casing of the compressor 174 to the intake passage 143 and/or intake passage 144. Additionally and/or alternatively, other vehicle components (e.g., a fuel tank, engine cover, etc.) may include a similar configuration of embedded housings. For example, one or more of the vehicle components described below (e.g., exhaust passages, transmission 54, etc.) may include embedded housings similar to the housings 182, with the housings adapted to receive fasteners in order to couple the vehicle components to other components of the vehicle 5 (e.g., a body of the vehicle 5) and maintain a position of the vehicle components within the vehicle 5. Examples of housings similar to the housings 182 are described below with reference to FIGS. 2A-2B, with example vehicle components configured to receive the housings being described below with reference to FIGS. 3A-3D, FIGS. 4A-4C, and FIG. 5.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from the fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature. The controller 12 receives signals from the various sensors of FIG. 1 and employs the various actuators of FIG. 1 to adjust engine operation based on the received signals and instructions stored on a memory of the controller. For example, adjusting an amount of intake air flowing to the cylinder 14 via intake passage 146 may include adjusting a position of the throttle 162 (e.g., an amount of rotation of the throttle plate 164) in order to increase or decrease airflow from the intake passage 144 to the intake passage 146.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation. One or more components of the hybrid vehicle may include housings adapted to receive fasteners, similar to the housings 182 adapted to receive fasteners 181 as described above. Example of housings similar to the housings 182 are described below with reference to FIGS. 2A-2B.

Figure 2A:
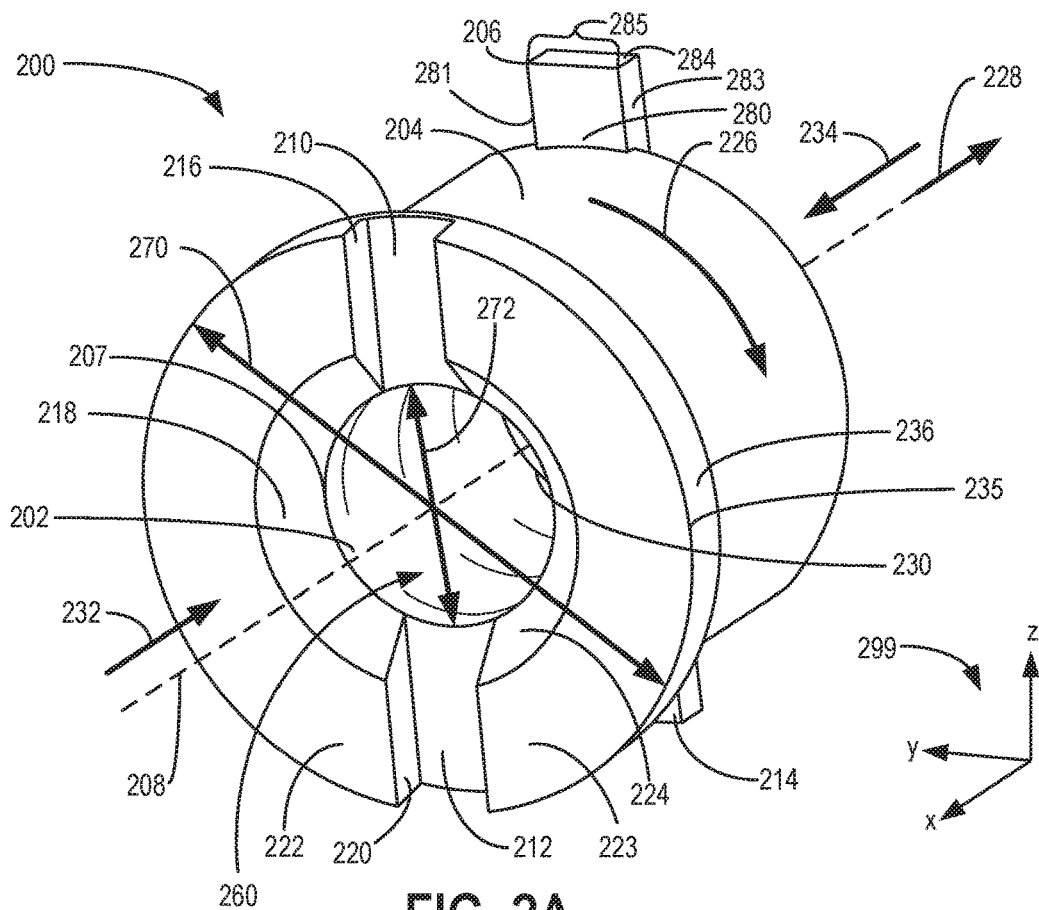
FIG. 2A shows a front perspective view of a housing for a fastener.

FIG. 2A shows a front perspective view of a housing 200 for a fastener, similar to the housings 182 described above with reference to FIG. 1, and FIG. 2B shows a side view of the housing 200. In some examples, the housing 200 is adapted to receive a fastener (e.g., a bolt) and does not house any other components. The housing 200 may be referred to herein as a housing for only a fastener. FIGS. 3A-4C show the housing 200 in various coupled (e.g., embedded) and decoupled (e.g., not embedded) configurations relative to a vehicle component (e.g., intake passage 143 described above with reference to FIG. 1). Reference axes 299 are included by each of FIGS. 2A-4C for comparison of the views shown.

The housing 200 includes a first opening 207 (which may be referred to herein as an aperture) adapted to receive a fastener (e.g., a bolt). The fastener may be inserted through the first opening 207 into a central conduit 260 of the housing 200. In some examples, the central conduit 260 may include threaded surfaces shaped to engage with counterpart threaded surfaces of the fastener. In other examples, the fastener and/or central conduit 260 may not be threaded.

The central conduit 260 is formed by inner walls 202 of the housing 200 and extends in a direction of a central axis 208 of the housing 200 through the housing 200. In one example, the fastener may be inserted into the central conduit 260 in an axial direction 228 parallel to the central axis 208. The central conduit 260 extends from a first end 232 of the housing 200 to a second end 234 of the housing 200 (e.g., from the first opening 207 positioned at the first end 232 to a second opening 230 positioned at the second end 234). The fastener may be inserted into the central conduit 260 into the first opening 207 at the first end 232. In some examples, the central conduit 260 may be closed at the second end 234 and open at the first end 232 (e.g., to receive the fastener)During conditions in which the housing 200 is embedded within a first vehicle component (e.g., the intake passage 143 shown by FIG. 1), a second vehicle component may be coupled to the first vehicle component by inserting the fastener through an aperture of the second vehicle component and into the central conduit 260 of the housing 200 via the first opening 207. An example of a first vehicle component coupled to a second vehicle component via a housing for a fastener (e.g., similar to the housing 200) is shown by FIG. 5 and described further below.

The housing 200 includes a first key 206 and an opposing, second key 214. The first key 206 is positioned opposite to the second key 214 across the central axis 208 of the housing 200. In one example, the first key 206 may be positioned 180 degrees from the second key 214 in a direction around the central axis 208. The first key 206 and the second key 214 are each formed by an outer surface 204 of the housing 200 and extend in a radial direction of the housing 200. For example, the first key 206 and the second key 214 each extend radially relative to the central axis 208 and outward from the outer surface 204 (e.g., with the first key 206 extending radially in a first direction 390, and with the second key 214 extending radially in an opposite, second direction 392). The first key 206 and second key 214 may each be referred to herein as radial keys. During conditions in which the housing 200 is inserted into the vehicle component (e.g., inserted into a passage of the vehicle component, as described below with reference to FIGS. 3A-4C), the first key 206 and the second key 214 each press against an exterior surface of the vehicle component to cut (e.g., carve) channels within the interior (e.g., interior wall) of the vehicle component.

In some examples, the first key 206 and second key 214 may each be included within a plurality of similar keys formed by the housing 200. For example, the housing 200 may include a different number of keys similar to the first key 206 and second key 214 relative to the examples shown by FIGS. 2A-4C, such as three keys, four keys, etc. In some examples, the plurality of keys may be positioned symmetrically around the outer surface 204 of the housing 200 relative to the central axis 208, and an amount of angle between adjacent keys may be a same amount (e.g., an angle of 360/n degrees, where n is the number of keys within the plurality of keys). For example, the housing 200 may include four keys similar to the first key 206 and second key 214, with each of the four keys being positioned away from each adjacent key by an angle of 90 degrees around the central axis 208. In other examples, one or more of the keys may be positioned asymmetrically relative to each other key (e.g., with an angle of 45 degrees between a first pair of adjacent keys, and an angle of 105 degrees between each other pair of adjacent keys). In yet further examples, one or more of the keys may be positioned at a different axial location along the outer surface 204 (e.g., with the first key 206 being positioned at the second end 234 of the housing 200, and with the second key 214 being positioned between the first key 206 and the first end 232 in the axial direction 228). In each example, each key of the plurality of keys is not joined to each adjacent key of the plurality of keys (e.g., each key is not joined or coupled to each other key by any surface of the housing 200 other than the outer surface 204).

Figure 2B:
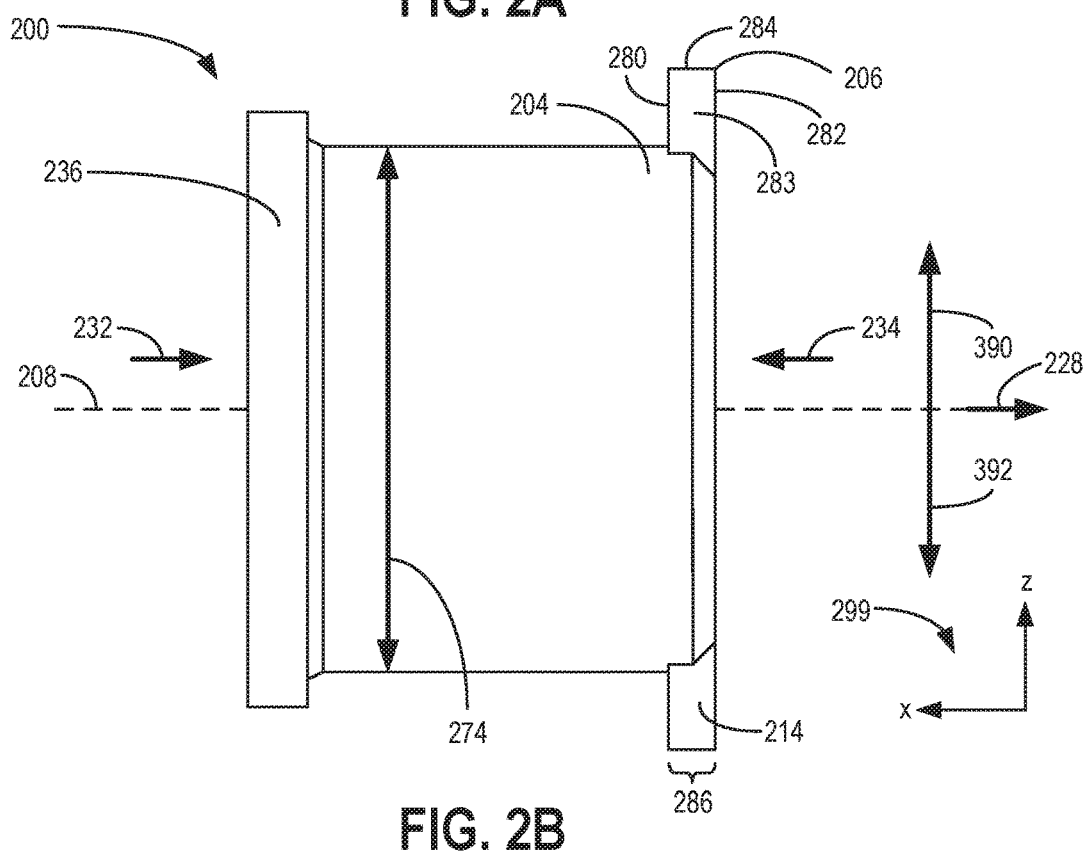
FIG. 2B shows a side elevation view of the housing.

In the example shown by FIGS. 2A-2B, the housing 200 includes a flange 235 positioned at the first end 232. The flange 235 extends radially relative to the central axis 208 and encircles the first opening 207. The flange 235 includes an outer, first planar surface 222 positioned parallel to an outer, second planar surface 223. The first planar surface 222 and second planar surface 223 may each be substantially flat surfaces (e.g., without curvature in a direction of the x-axis of reference axes 299). The first planar surface 222 is separated from the second planar surface 223 by a first slot 210 and a second slot 212. The first slot 210 and the second slot 212 are each depressions formed in the flange 235 at a center of the flange 235 and may be referred to herein as grooves. The first slot 210 and the second slot 212 each extend radially outward relative to the central axis 208 and are shaped to engage with a rotatable drive tool (e.g., an arm of an assembly device). The rotatable drive tool may rotate against the first slot 210 and the second slot 212 (e.g., apply a torque to sidewalls 216 of the first slot 210 and sidewalls 220 of the second slot 212) in order to rotate the housing 200.

First planar surface 222 and second planar surface 223 each encircle the first opening 207. In the example shown by FIGS. 2A-2B, the first planar surface 222 tapers to the first opening 207 via a first tapered surface 218, and the second planar surface 223 tapers to the first opening 207 via a second tapered surface 224. In other examples, the first planar surface 222 and/or second planar surface 223 may not taper to the first opening 207 (e.g., the first planar surface 222 and/or second planar surface 223 may be joined to the first opening 207 via one or more surfaces arranged perpendicular to the first planar surface 222 and second planar surface 223). The first tapered surface 218 tapers inward to the first opening 207 from the first planar surface 222 and the second tapered surface 224 tapers inward to the second planar surface 223. The first slot 210 is formed partially by the sidewalls 216 of the first planar surface 222 and the second planar surface 223, and the second slot 212 is formed partially by the sidewalls 220 of the first planar surface 222 and the second planar surface 223. Sidewalls 216 and sidewalls 220 each extend in a direction of the x-axis and the z-axis of the reference axes 299 (e.g., outward relative to the central axis 208).

An outer circumferential surface 236 of the flange 235 encircles the first opening 207 and the central conduit 260. A diameter 270 of the outer circumferential surface 236 is greater than a diameter 272 of the central conduit 260 (shown by FIG. 2A) and a diameter 274 of the outer surface 204 (shown by FIG. 2B). During conditions in which the housing 200 is coupled to the vehicle component, the outer circumferential surface 236 encircles a passage of the vehicle component (e.g., a passage into which the housing 200 is inserted). The first planar surface 222 and second planar surface 223 may be positioned parallel to the exterior surface of the vehicle component (e.g., exterior surface 310 shown by FIGS. 3A-4C) and engaged in face-sharing contact with the exterior surface. An opening of the passage through which the housing 200 is inserted may be covered (e.g., blocked) by the flange 235 (e.g., by first planar surface 222 and second planar surface 223), with the central conduit 260 of the housing 200 extending into the passage. In the example shown by FIGS. 2A-2B, outer circumferential surface 236 and outer surface 204 of the housing 200 each have an approximately cylindrical shape (e.g., a circular cross-section in a plane of the y-axis and z-axis of reference axes 299). In other examples, the outer circumferential surface 236 and/or outer surface 204 of the housing 200 may have a different shape (e.g., a differently shaped cross-section in the plane of the y-axis and z-axis, such as a hexagonal shape, rectangular shape, etc.).

The first key 206 and the second key 214 each include planar surfaces radially relative to the central axis 208 and outward from the outer surface 204 of the housing 200 (e.g., outward from the central axis 208). For example, the first key 206 includes a first planar key surface 280 and a second planar key surface 282, with the first planar key surface 280 and the second planar key surface 282 being parallel to each other. The first planar key surface 280 and the second planar key surface 282 are joined together by an end surface 284. In the example shown by FIGS. 2A-2B, the end surface 284 is a flat, planar surface (e.g., without curvature). In other examples, the end surface 284 may be curved (e.g., end surface 284 may have a curvature in a direction toward or away from the central axis 208). In some examples, the first key 206 and second key 214 each extend radially further than the flange 235 from the outer surface 204 of the housing 200 (e.g., extend radially relative to the central axis 208 past the outer circumferential surface 236 of the flange 235).

The first key 206 additionally includes a first side surface 281 positioned parallel to a second side surface 283, with the first side surface 281 and the second side surface 283 each extending in a perpendicular direction relative to the end surface 284, first planar key surface 280, and second planar key surface 282. In the example shown by FIGS. 2A-2B, the first side surface 281 and second side surface 283 are flat, planar surfaces (e.g., without curvature). In other examples, the first side surface 281 and/or second side surface 283 may be shaped differently (e.g., may be curved in the circumferential direction). In some examples, a width 285 of each of the first planar key surface 280 and the second planar key surface 282 in the circumferential direction 226 may be greater than a length 286 of the first key 206 in the axial direction 228 (e.g., length 286 of the first side surface 281 and second side surface 283). However, each of the first key 206 and second key 214 do not extend along an entire perimeter of the outer surface 204. Specifically, in the example shown by FIGS. 2A-2B, the length 286 of the first side surface 281 and second side surface 283 is less than one-half an entire length of the outer surface 204 in the circumferential direction 226 around the central axis 208. Similarly, in other examples in which the housing 200 includes a different number of keys similar to the first key 206 and second key 214, each of the keys does not extend along the entire perimeter of the outer surface 204 (e.g., the length 286 is less than [π*D]/n, where n is the total number of keys of the housing, π is the mathematical constant approximated as 3.14, and D is the diameter 274 of the outer surface 204). In one example, the housing 200 may include four keys similar to the first key 206 and second key 214, and the length 286 of the first side surface 281 and second side surface 283 is less than one-fourth of the entire length of the outer surface 204 in the circumferential direction.

Although the first key 206 is described above as one example, each key of the housing 200 may include a similar configuration of surfaces (e.g., surfaces similar to the end surface 284, first planar key surface 280, second planar key surface 282, first side surface 281, and second side surface 283, in a similar relative arrangement). For example, second key 214 may include a similar configuration relative to the first key 206.

During conditions in which the housing 200 is rotated against the interior of the vehicle component (as described below with reference to FIGS. 3C-3D and FIG. 4C), the surfaces of the keys of the housing 200 (e.g., first key 206 and second key 214) press against surfaces of the interior of the vehicle component and depress the surfaces of the interior in the direction of the rotation (e.g., cut into the interior of the vehicle component). As described further below, the first planar key surface 280 and the second planar key surface 282 engage with the interior of the vehicle component in order to lock the housing 200 into the interior after the housing 200 has been rotated to depress the surfaces of the interior.

FIGS. 3A-3D each show a side cross-sectional view of the housing 200 of FIGS. 2A-2B relative to a passage 313 of a vehicle component (e.g., a passage formed within an exterior surface of the intake passage 143 shown by FIG. 1 and described above). FIG. 3A shows a side cross-sectional view of the housing 200 and passage 313 with the housing 200 decoupled from the passage 313 (e.g., prior to insertion of the housing 200 into the passage 313). FIG. 3B shows a side cross-sectional view of the housing 200 inserted into the passage 313, with the keys of the housing 200 (e.g., first key 206 and second key 214) cutting (e.g., carving) channels into an interior 327 (which may be referred to herein as an interior wall) of the vehicle component (as described in further detail below). FIG. 3C shows a side cross-sectional view of the housing 200 and indicates a rotation direction of the housing 200 within the passage 313 of the vehicle component. FIG. 3D shows an alternate side cross-sectional view of the housing 200 after the housing 200 has been rotated within the passage 313.

Turning first to FIG. 3A, the housing 200 is shown decoupled from the vehicle component 312. In one example, the vehicle component 312 may be an intake passage (e.g., intake line), such as the intake passage 143 shown by FIG. 1 and described above. In other examples, the vehicle component 312 may be a different type of component of a vehicle, such as a fuel tank, a compressor, an engine cover, etc. The vehicle component 312 includes a passage 313 having an inner surface 316 and an opening 314. The opening 314 is encircled by an outer surface 310, which may be referred to herein as an exterior surface of the vehicle component 312. In the example showing by FIGS. 3A-4C, the exterior surface 310 is a planar surface. In other examples, the exterior surface 310 may be a curved surface or may include a surface treatment (e.g., knurling). An inner diameter 323 of the passage 313 may be less than an outer diameter 325 of the outer surface 204 of the housing 200. During conditions in which the housing 200 is inserted into the passage 313, the outer surface 204 of the housing 200 may press against the inner surface 316 of the passage 313 and may increase (e.g., expand) the inner diameter 323 of the passage to approximately a same amount as the outer diameter 325, as shown by FIG. 3D.

In order to embed the housing 200 within the vehicle component 312, the housing 200 is inserted into the passage 313 in the axial direction 228 parallel to the central axis 208. Specifically the second end 234 of the housing 200 is pressed against the exterior surface 310 of the vehicle component 312 in order to press the housing 200 into the passage 313. As the housing 200 is pressed against the exterior surface 310 of the vehicle component 312, the first key 206 and the second key 214 press against the exterior surface 310 and depress the exterior surface 310 into an interior 327 of the vehicle component 312. The first key 206 presses against the exterior surface 310 in the axial direction 228 in order to form a first section 300 of a first channel 371, and the second key 214 presses against the exterior surface 310 in the axial direction 228 in order to form a first section 302 of a second channel 373, as shown by FIGS. 3A-3C and FIGS. 4B-4C. The first section 300 of the first channel 371 may extend in the axial direction 228 of the housing 200 (e.g., into the vehicle component 312 from the exterior surface 310 of the vehicle component 312) and not in the circumferential direction 226 of the housing 200. Similarly, the first section 302 of the second channel 373 may extend in the axial direction 228 of the housing 200 (e.g., into the vehicle component 312 from the exterior surface 310 of the vehicle component 312) and not in the circumferential direction 226 of the housing 200.

During conditions in which the housing 200 is rotated within the vehicle component 312 after being embedded within the vehicle component 312 in the axial direction 228 (as shown by FIG. 3D and FIG. 4C), the first key 206 presses against the interior 327 in the circumferential direction 226 to form a second section 308 of the first channel 371, and the second key 214 presses against the interior 327 in the circumferential direction 226 to form a second section 306 of the second channel 373. The second section 308 of the first channel 371 extends in the circumferential direction 226 and not the axial direction 228, and is joined with the first section 300 of the first channel 371 at an end 380 of the first section 300 opposite to the exterior surface 310 in the axial direction 228. The second section 306 of the second channel 373 extends in the circumferential direction 226 and not the axial direction 228, and is joined with the first section 302 of the second channel 373 at an end 382 of the first section 302 opposite to the exterior surface 310 in the axial direction 228. In some examples, the first channel 371 may include only the first section 300 and the second section 308, and the second channel 373 includes only the first section 302 and the second section 306. In examples in which the housing 200 includes additional keys similar to the first key 206 and second key 214 (as described above), each key may form a channel having only an axial, first section joined to a circumferential, second section, similar to the first section 300 and second section 308 described above, with each channel formed by each key being separate from each other channel. In one example, the housing 200 includes only the first key 206 and the second key 214, the first key 206 being positioned 180 degrees from the second key 214 in the circumferential direction 226 around the central axis 208, and the housing 200 is rotated within the vehicle component 312 by an amount less than 180 degrees. In another example, the housing 200 includes four keys similar to the first key 206 and the second key 214, with each key being positioned away from each adjacent key by an angle of 45 degrees around the central axis 208, and the housing 200 is rotated within the vehicle component 312 by an amount less than 45 degrees.

In some examples, the housing 200, first key 206, and/or second key 214 may be heated above a threshold temperature prior to the housing 200 being inserted into the passage 313. For example, the threshold temperature may be a melting temperature of the vehicle component, and a temperature of the housing may be increased above the melting temperature of the vehicle component before the housing 200 is pressed against the exterior surface 310 (e.g., the temperature of the housing 200 is maintained above the melting temperature of the vehicle component 312 as the housing is pressed against the exterior surface 310). First key 206 and the second key 214 may melt a material of the interior 327 in order to form the first channel 371 and second channel 373, respectively. In one example, the vehicle component 312 (and the interior 327) may be formed from a polymer material, such as a thermoplastic, and the housing 200 may be formed from a metal material, such as steel. A melting temperature of the housing 200 may be greater than the melting temperature of the vehicle component 312.

In another example, the first key 206 and/or the second key 214 may include one or more features configured to enable the first key 206 and/or second key 214 to more easily cut into the interior 327 of the vehicle component 312. For example, the first planar key surface 280 and second planar key surface 282 of the first key 206 may be joined to one or more surfaces tapered increase a sharpness of the first key 206. In one example, one or each of the first side surface 281 and second side surface 283 (shown by FIGS. 2A-2B and described above) may be a curved surface tapered in the circumferential direction 226 (shown by FIGS. 2A-2B) in order to increase a cutting ability of the first key 206 in the circumferential direction 226. In another example, one or more of the end surface 284, first planar key surface 280, and/or second planar key surface 282 may be shaped (e.g., tapered) to increase a cutting ability of the first key 206 in the axial direction 228. Although the first key 206 is described herein as an example, one or more other keys of the housing 200 (e.g., second key 214) may include a similar configuration (e.g., a similar relative arrangement of tapered surfaces).

After the housing 200 has been embedded within the passage 313 in the axial direction 228 (as shown by FIG. 3B), the housing 200 is rotated within the passage 313 in order to embed the first key 206 and second key 214 into the interior 327 in the circumferential direction 226. Specifically, as described above, the housing 200 is first inserted into the passage 313 in the axial direction 228 as the first key 206 and second key 214 each press against the exterior surface 310 of the vehicle component 312 to form the first channel 371 and second channel 373, respectively. The housing 200 is then rotated within the passage 313, without moving the housing 200 in the axial direction 228, in order to press the first key 206 and second key 214 against the interior 327 (e.g., interior surfaces) of the vehicle component in the circumferential direction 226. Rotating the housing 200 as described above results in the first key 206 cutting the second section 308 of the first channel 371 into the interior 327 as the second key 214 cuts the second section 306 of the second channel 373 into the interior 327.

FIG. 3C shows a first position of the first key 206 in solid lines (e.g., prior to rotation of the housing 200), with a resulting, second position 304 of the first key 206 shown in dotted lines (e.g., after rotation of the housing 200 as described above). In other words, the housing 200 is rotated in the circumferential direction 226 around the central axis 208 (e.g., around the x-axis of reference axes 299), with the first key 206 moving from the first position toward the second position 304 due to the rotation.

To illustrate further, FIGS. 4A-4C each show a front view of the housing 200 and vehicle component 312. Specifically, FIG. 4A shows a front view of the housing 200 and vehicle component 312 with the housing 200 decoupled from the vehicle component 312 (e.g., prior to inserting the housing 200 into the vehicle component 312, similar to the conditions shown by FIG. 3A), FIG. 4B shows a front view of the housing 200 inserted into the vehicle component 312 (e.g., similar to the conditions shown by FIG. 3B and described above), and FIG. 4C shows a front view of the housing 200 rotated within the vehicle component 312 (e.g., similar to the conditions shown by FIG. 3D). FIG. 4B shows the first key 206 in the first position described above with reference to FIG. 3C, and FIG. 4C shows the first key 206 in the second position 304 described above with reference to FIG. 3C. In one example, the amount of rotation of the housing 200 may be less than 360/n degrees, where n is the total number of keys of the housing 200 (e.g., keys similar to the first key 206 and second key 214). Said another way, the second section 308 of the first channel 371 and the second section 306 of the second channel 373 are not joined with each other around the passage 313.

As shown by the rotated view of FIG. 3D (e.g., rotated relative to the view shown by FIG. 3C), after the housing 200 has been rotated within the passage 313 of the vehicle component 312 as described above, the first key 206 and second key 214 are locked into position by the interior 327 of the vehicle component 312 (e.g., the first key 206 and second key 214 are unable to move in directions parallel to the central axis 208, such as the axial direction 228, after rotation of the housing 200 within the vehicle component 312). Additionally, during conditions in which the housing 200 is heated to a temperature above the melting temperature of the vehicle component 312 prior to insertion of the housing 200 into the vehicle component 312 (as described above), the material of the interior 327 may fuse to the first key 206 and second key 214 after rotation of the housing 200 within the passage 313 in order to further lock the housing 200 to the vehicle component 312. For example, the melted material of the interior 327 may flow into a portion of the second section of each channel (e.g., second section 308 and second section 306) after rotation of the housing 200 within the vehicle component 312 and may lock the housing 200 from rotating further (e.g., block the housing 200 from rotating in an opposite direction around the central axis 208 relative to the direction in which the housing 200 was rotated to form the second section 308 and second section 306). In this way, the housing 200 is embedded within the vehicle component 312 and provides reinforcement to the vehicle component 312. For example, as shown by FIG. 5 and described in further detail below, the housing 200 may provide reinforcement for coupling the vehicle component 312 to other components via fasteners.

FIG. 5 shows a perspective view of a vehicle component 550 of a vehicle (e.g., similar to intake passage 143 of vehicle 5 described above with reference to FIG. 1, and vehicle component 312 described above with reference to FIGS. 3A-4C). Several of the components shown by FIG. 5 are similar to those described above with reference to FIGS. 1-4C. For example, FIG. 5 shows a plurality of housings 500, similar to the housing 200 shown by FIGS. 2A-4C and described above. The housings 500 are each adapted to receive a fastener 524 (e.g., similar to the fastener 181 shown by FIG. 1 and described above) and are embedded within the vehicle component 550. Specifically, each housing 500 is inserted into a corresponding passage 521 of the vehicle component 550 in an axial direction 526 of the housing 500 (e.g., similar to the passage 313 and axial direction 228 described above), with the corresponding passage 521 being formed by an interior 529 of the vehicle component 550 (e.g., a solid, continuous section of the vehicle component 550 that does not contain spaces or gaps and is not hollow). The passages 521 each include an inner surface 520 (e.g., similar to the inner surface 316). The interior 529 may be referred to herein as an interior wall.

Each housing 500 includes a flange 523 having a first slot 508 and a second slot 510 (e.g., similar to the flange 235, first slot 210, and second slot 212, respectively), a central conduit 532 extending through the housing 500 along a central axis 522 of the housing 500 from a first opening 502 to a second opening 518 (e.g., similar to central conduit 260, central axis 208, first opening 207, and second opening 230, respectively), and a first key 514 and a second key 516 (e.g., similar to first key 206 and second key 214, respectively).

Similar to the embedding of the housing 200 into the vehicle component 312 as described above, each housing 500 is first inserted into the vehicle component 550 in the axial direction 526. As each housing 500 is inserted into the vehicle component 550 in the axial direction 526, the first key 514 and second key 516 each cut into the vehicle component 550 in the axial direction 526, as shown by a first section 504 of a first channel cut by the first key 514 (e.g., similar to first section 300 of first channel 371 described above) and a first section 506 of a second channel cut by the second key 516 (e.g., similar to first section 302 of second channel 373 described above).

For each housing 500, after the housing 500 has been inserted into the vehicle component 550 as described above, the housing 500 is rotated in a circumferential direction 540 (e.g., similar to circumferential direction 226) within the vehicle component 550 in order to lock the housing 500 to the vehicle component 550. Specifically, as the housing 500 is rotated within the vehicle component 550, the first key 514 and second key 516 each cut into the vehicle component in the circumferential direction 226. First key 514 cuts a second section 512 of the first channel into the vehicle component 550 (e.g., similar to second section 308 of the first channel 371 described above), and second key 516 cuts a second section of the second channel into the vehicle component 550 (e.g., similar to the second section 306 of the second channel 373 described above). Cutting the channels into the vehicle component 550 in this way forms an undercut within the vehicle component 550 that locks each housing 500 within the vehicle component 550 (e.g., prevents each housing 500 from being moved within the vehicle component 550 and from being removed from the vehicle component 550).

FIG. 5 additionally shows a portion of a different, second vehicle component 528 (similar to the intake passage 142 shown by FIG. 1 and described above, in one example) in order to illustrate the second vehicle component 528 being coupled to the vehicle component 550 via the fastener 524 inserted into the housing 500. In the example shown by FIG. 5, the second vehicle component 528 includes an opening 530 shaped to receive the fastener 524. In order to couple the second vehicle component 528 to the vehicle component 550, the opening 530 of the second vehicle component 528 is aligned with the first opening 502 of the housing 500, and the fastener 524 is inserted through the opening 530, into the first opening 502, and into the central conduit 532 of the housing 500. In this configuration, the second vehicle component 528 is positioned between a head 527 of the fastener 524 and the housing 500, and is secured to the vehicle component 550 via engagement of the fastener 524 with the housing 500. In some examples, the fastener 524 may include a threaded outer surface shaped to engage with a counterpart threaded surface of the central conduit 532 (e.g., similar to the examples described above with reference to FIG. 1 and FIGS. 2A-2B).

By embedding the housing 500 within the vehicle component 550 and coupling the second vehicle component 528 to the vehicle component 550 via the fastener 524 inserted through both of the opening 530 of the second vehicle component 528 and the first opening 502 of the housing 500, a sturdiness of a coupling interface between the vehicle component 550 and the second vehicle component 528 may be increased. For example, by embedding the housing 500 within the vehicle component 550, the vehicle component 550 is reinforced, and the second vehicle component 528 may be coupled to the vehicle component 550 via the fastener 524 and housing 500 with an increased likelihood that a position of the second vehicle component 528 relative to the vehicle component 550 is maintained.

Figure 6:
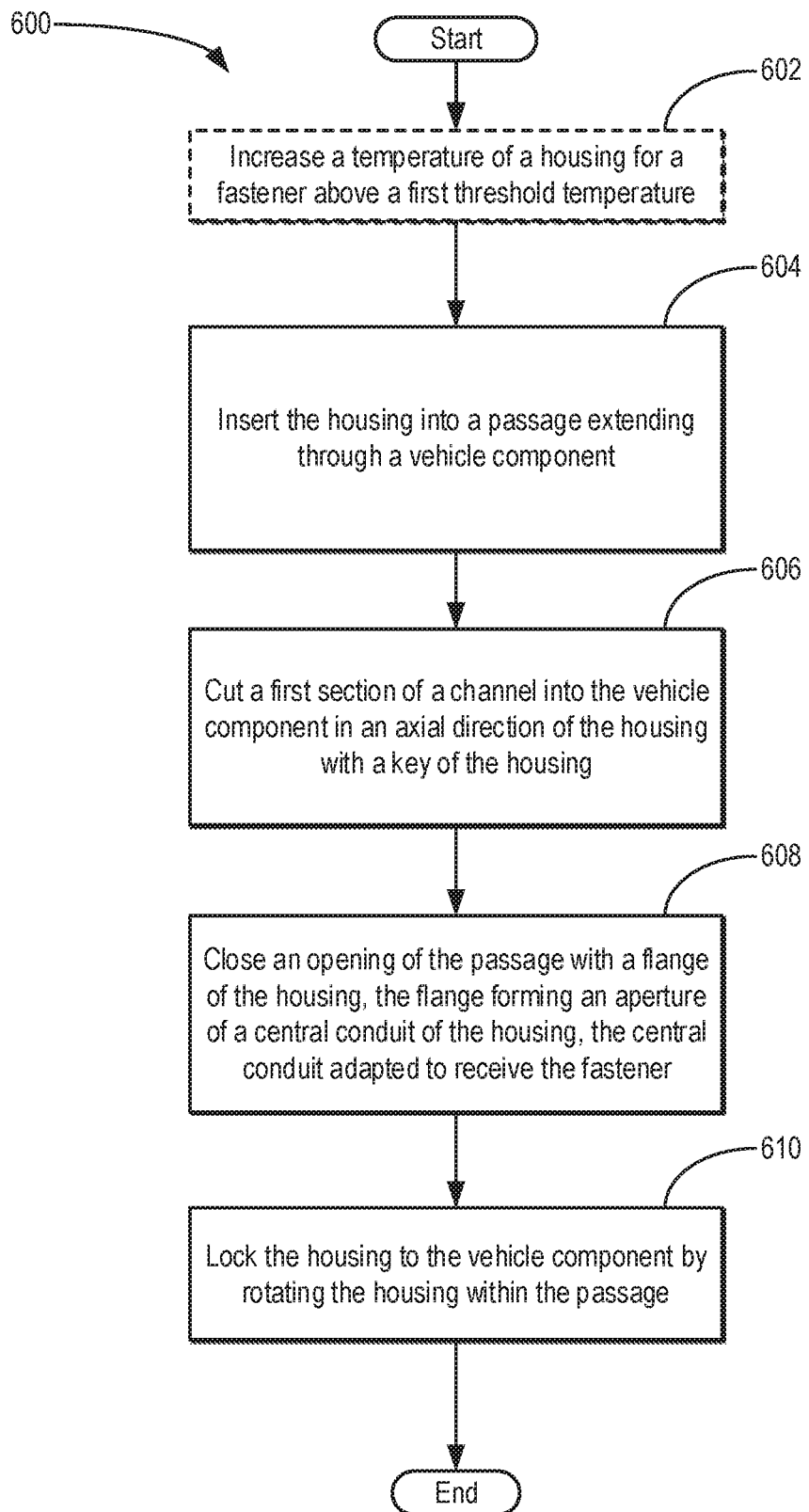
FIG. 6 shows a flowchart illustrating a method for coupling a housing for a fastener to a vehicle component.

FIG. 6 shows a flowchart illustrating a method 600 for coupling a housing for a fastener to a vehicle component. The housing may be similar to the housings described above (e.g., housing 182 described above with reference to FIG. 1, the housing 200 described above with reference to FIGS. 2A-4C, and/or housing 500 described above with reference to FIG. 5). The vehicle component may be similar to the vehicle components described above (e.g., intake passage 143 described above with reference to FIG. 1, vehicle component 312 described above with reference to FIGS. 3A-4C, and/or vehicle component 550 described above with reference to FIG. 5). The fastener may be similar to the fasteners described above (e.g., fastener 181 described above with reference to FIG. 1, and/or fastener 524 described above with reference to FIG. 5). Instructions for carrying out method 600 and the rest of the methods included herein may be executed by a controller (e.g., an electronic controller of an assembly device of the vehicle component and/or housing) based on instructions stored on a memory of the controller.

At 602, the method optionally includes increasing a temperature of a housing for a fastener above a threshold temperature. In one example, the threshold temperature may be a melting temperature of the vehicle component. For example, the vehicle component may be formed of a polymer material (e.g., glass-filled nylon, such as 30% glass-fiber reinforced polycaprolactam) having a melting temperature of 550 Kelvin, and at 602, the housing may be heated to a temperature above 550 Kelvin.

The method at 604 includes inserting the housing into a passage extending through the vehicle component. For example, the housing may be inserted into the passage in an axial direction of the housing (e.g., similar to axial direction 228 and axial direction 526) by pressing the housing into an opening of the passage (e.g., opening 314 shown by FIGS. 3A-3C). The opening may have an inner diameter that is smaller than a diameter of an outer surface of the housing (e.g., similar to the examples described above with reference to inner diameter 323 of the passage 313 and outer diameter 325 of the outer surface 204). As the housing is inserted (e.g., driven) into the passage as described above, the housing may expand the passage (e.g., increase the diameter of the passage). The outer surface of the housing may press against an inner surface of the passage and may deform the inner surface, expanding the passage.

The method continues from 604 to 606 where the method includes cutting a first section of a channel into the vehicle component in an axial direction of the housing with a key of the housing. In one example, the key may be similar to the first key 206 described above with reference to FIGS. 2A-4C, or the first key 514 described above with reference to FIG. 5, and the first section of the channel may be similar to the first section 300 of a first channel 371 described above with reference to FIGS. 3A-4C, or the first section 504 of the first channel described above with reference to FIG. 5. In another example, the key may be similar to the second key 214 described above with reference to FIGS. 2A-4C, or the second key 516 described above with reference to FIG. 5, and the first section of the channel may be similar to the first section 302 of second channel 373 described above with reference to FIGS. 3A-4C, or the first section 506 of the second channel described above with reference to FIG. 5.

In some examples, as the first section is cut into the vehicle component, the housing is not rotated within the vehicle component. For example, the first section may be cut into the vehicle component by the key of the housing by moving the key against the vehicle component in the axial direction and not in the circumferential direction. Said another way, the housing may not be rotated as the first section is cut into the vehicle component. Cutting the first section into the vehicle component may include pressing the key of the housing against an exterior surface of the vehicle component to depress the exterior surface by a first length in the axial direction, with the exterior surface being a surface of the vehicle component that forms the opening of the passage of the vehicle component (e.g., the passage into which the housing is inserted). In one example, the first length may be a length from a first opening (which may be referred to herein as an aperture) of the housing to a second opening of the housing in the axial direction (e.g., first opening 207 and second opening 230 shown by FIG. 2A and described above).

If a temperature of the housing was increased above the threshold temperature at 602, the key of the housing may form the first section of the channel within an interior of the vehicle component (e.g., similar to interior 327 shown by FIGS. 3A-3D, and interior 529 shown by FIG. 5) and adjacent to the passage by melting the interior. For example, by increasing the temperature of the housing above the threshold temperature, a temperature of the key is also increased above the threshold temperature. The key may be pressed against the interior and may heat the interior, softening (e.g., melting) the interior to increase an ease with which the key may cut into the interior to form the first section of the channel (e.g., reducing an amount of pressing force applied to the key in order to cut the first section). Additionally, by heating the interior of the vehicle component with the key of the housing, the interior of the vehicle component may partially fuse to the key of the housing, preventing the key and housing from moving in a direction opposite to the axial direction (e.g., the direction in which the housing was inserted into the vehicle component) and away from the vehicle component so that the housing is not removed from the vehicle component after cutting the first section. In other examples in which the housing is not heated above the threshold temperature, the pressing of the outer surface of the housing against the inner surface of the passage to expand the passage (as described above at 604) may increase a friction between the housing and the interior of the vehicle component, preventing the housing from being removed from the vehicle component after cutting the first section.

The method continues from 606 to 608 where the method includes closing the opening of the passage with a flange of the housing, the flange forming the aperture of a central conduit of the housing. For example, the central conduit may be similar to the central conduit 260 shown by FIG. 2A, and the central conduit 532 shown by FIG. 5. The central conduit is adapted to receive the fastener via the aperture (e.g., in order to couple a second vehicle component, such as second vehicle component 528 partially shown by FIG. 5, to the vehicle component having the housing embedded therein). As described above, the aperture may be similar to the first opening 207 shown by FIG. 2A and FIGS. 3A-4C.

The method continues from 608 to 610 where the method includes locking the housing to the vehicle component by rotating the housing within the passage. For example, as described above, locking the housing to the vehicle component may include cutting a second section of the channel into the vehicle component with the key in a circumferential direction of the housing (e.g., by rotating the housing in the circumferential direction, as described above). In some examples, locking the housing to the vehicle component includes not moving the housing in the axial direction. For example, at 610, the housing may be rotated in the circumferential direction and may not be moved in the axial direction (or in a direction that is not the circumferential direction). The housing may be rotated by an amount such that the second section is cut into the vehicle component and the second section does not encircle an entire perimeter of the outer surface of the housing in the circumferential direction. For example, as described above with reference to FIGS. 3A-4C, the amount of rotation of the housing in the circumferential direction may be less than 360/n degrees, where n is the total number of keys of the housing. The second section is joined with the first section at an end of the first section opposite to the exterior surface of the vehicle component in the axial direction. Said another way, the first section extends from the exterior surface into the interior of the vehicle component, and is joined with the second section within the interior.

By moving the housing as described above, the channel includes only the first section formed by pressing the key against the interior in the axial direction of the housing and not in the circumferential direction of the housing (as described above at 606), and the second section formed by pressing the key against the interior in the circumferential direction and not in the axial direction. The second section may be joined only with the first section, the channel is not joined to any other channels. For example, the channel may be one of a plurality of channels cut into the vehicle component by the housing (e.g., via first key 206, second key 214, and/or a plurality of additional, similar keys), and each channel cut into the vehicle component (e.g., first channel 371 formed by first key 206) is not joined to any other channels cut into the vehicle component (e.g., second channel 373 formed by second key 214). The first and second sections of the channel are each sealed from the passage by the outer surface of the housing. In examples in which the temperature of the housing is increased above the threshold temperature (e.g., as described at 602), the inner surface of the passage of the vehicle component may partially fuse to the outer surface of the housing to seal the channel from the passage. In examples in which the housing is not heated above the threshold temperature, a gap between the outer surface of the housing and the inner surface of the passage may be insufficient for fluids (e.g., air, water, etc.) to flow through, effectively sealing the channel from the passage (e.g., sealing the channel so that fluids and/or particles may not flow from the passage to the channel, or vice versa).

The key may be positioned at an end of the second section after cutting the second section (e.g., the end of the second section positioned away from the first section in the circumferential direction), and after cutting the second section into the vehicle component, the key is not movable in the axial direction. Specifically, the key may not be moved (e.g., removed) from the end of the second section after cutting the second section, thereby locking the key to the second section (and locking the housing to the vehicle component).

FIGS. 2A-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, the keys of the housing cut channels into the vehicle component and retains the position of the housing within the vehicle component. Cutting the channels into the vehicle component as described above forms an undercut within the vehicle component that locks the housing to the vehicle component and prevents the housing from being moved within the vehicle component, and decreases a likelihood that the housing will be decoupled from the vehicle component. The housing may increase a load-bearing quality of the vehicle component by providing reinforcement to the vehicle component, enabling a position of the vehicle component to be maintained (e.g., relative to the vehicle or other vehicle components). Additionally, the keys of the housing may reduce a likelihood of the housing from being decoupled from the vehicle component. The technical effect of cutting the channels into the vehicle component with the keys of the housing is to embed the housing within the vehicle component, to secure the housing from moving relative to the vehicle component, and to provide reinforcement to the vehicle component for coupling the vehicle component to other components of the vehicle.

In one embodiment, a method comprises: inserting a housing for a fastener into a passage extending into a vehicle component while cutting a first section of a channel into the vehicle component in an axial direction of the housing with a key of the housing, the key extending radially outward from an outer surface of the housing; then, locking the housing to the vehicle component by rotating the housing within the passage. In a first example of the method, the housing is not rotated as the first section is cut into the vehicle component, and the housing is not removed from the vehicle component after cutting the first section and before locking the housing to the vehicle component. A second example of the method optionally includes the first example, and further includes wherein locking the housing to the vehicle component includes not moving the housing in the axial direction. A third example of the method optionally includes one or both of the first and second examples, and further includes wherein locking the housing to the vehicle component includes cutting a second section of the channel into the vehicle component with the key in a circumferential direction of the housing and positioning the key at an end of the second section. A fourth example of the method optionally includes one or more or each of the first through third examples, and further includes wherein the second section is joined only with the first section and the channel is not joined to any other channels, and wherein the channel including the first and second sections is sealed from the passage by the outer surface of the housing. A fifth example of the method optionally includes one or more or each of the first through fourth examples, and further includes wherein, while the key is positioned at the end of the second section, the key is not movable in the axial direction. A sixth example of the method optionally includes one or more or each of the first through fourth examples, and further includes wherein the second section does not encircle an entire perimeter of the outer surface of the housing in the circumferential direction. A seventh example of the method optionally includes one or more or each of the first through sixth examples, and further includes, before inserting the housing into the passage and cutting the first section, increasing a temperature of the housing above at least 550 Kelvin. An eighth example of the method optionally includes one or more or each of the first through seventh examples, and further includes wherein cutting the first section into the vehicle component includes pressing the key of the housing against an exterior surface of the vehicle component to depress the exterior surface by a first length in the axial direction, the exterior surface forming an opening of the passage. A ninth example of the method optionally includes one or more or each of the first through eighth examples, and further includes wherein inserting the housing into the passage includes pressing the housing into the opening, the opening having an inner diameter smaller than a diameter of the outer surface of the housing.

In one embodiment, a system comprises: a vehicle component; a housing for only a fastener, the housing embedded within the vehicle component and including a radial key; and a channel carved within the vehicle component by the key, a first section of the channel extending in an axial direction of the housing and not in a circumferential direction of the housing, a second section of the channel extending in the circumferential direction and not the axial direction. In a first example of the system, the vehicle component is formed of a softer, first material and the housing is formed of a harder, second material, the second material having a higher melting temperature than the first material. A second example of the system optionally includes the first example, and further includes wherein the first section extends in the axial direction of the housing into the vehicle component from an exterior surface of the vehicle component, and the second section extends through the vehicle component in the circumferential direction, the second section joined with the first section at an end of the first section opposite to the exterior surface in the axial direction. A third example of the system optionally includes one or both of the first and second examples, and further includes wherein the housing includes a central conduit extending through the housing in the axial direction from a first end of the housing to a second end of the housing, the first end including a flange extending radially from an outer surface of the housing and encircling the central conduit, the flange including an outer, planar surface positioned parallel to an exterior surface of the vehicle component and engaged in face-sharing contact with the exterior surface, the planar surface of the flange including a slot shaped to engage with a rotatable drive tool. A fourth example of the system optionally includes one or more or each of the first through third examples, and further includes wherein the key includes a planar, first surface positioned parallel to a planar, second surface, the first and second planar surfaces extending radially outward from an outer surface of the housing, with a width of the first and second planar surfaces in a circumferential direction of the housing being greater than a length of the key in the axial direction, and wherein the key does not extend along an entire perimeter of the outer surface. A fifth example of the system optionally includes one or more or each of the first through fourth examples, and further includes wherein the key is one of a plurality of radial keys extending outward from an outer surface of the housing, with each key of the plurality of keys being angled by a same amount relative to each adjacent key of the plurality of keys around a central axis of the housing, and wherein each key of the plurality of keys is not joined to each adjacent key of the plurality of keys.

In another embodiment, a method comprises: increasing a temperature of a housing for a fastener above a melting temperature of an intake line of a vehicle; expanding a passage of the intake line by driving the housing into an opening of the passage; and forming a channel within an interior wall of the intake line and adjacent to the passage by melting the interior wall with a radial key of the housing while pressing the key against the interior wall, the key extending outward from an outer surface of the housing, where the channel includes only: a first section formed by pressing the key against the interior wall in an axial direction of the housing and not in a circumferential direction of the housing; and a second section formed by pressing the key against the interior wall in the circumferential direction and not in the axial direction. In a first example of the method, the method further comprises closing the opening of the passage with a flange of the housing, the flange forming an aperture of a central conduit of the housing, the central conduit adapted to receive the fastener. A second example of the method optionally includes the first example, and further includes wherein expanding the passage includes pressing the outer surface of the housing against an inner surface of the passage. A third example of the method optionally includes one or both of the first and second examples, and further includes wherein the first section is formed before the second section, and wherein forming the second section locks the key into the second section.

In another representation, a system comprises: a vehicle component; a housing for a fastener, the housing embedded within the vehicle component and including inner surfaces forming a central conduit adapted to receive the fastener and outer surfaces forming a key extending radially outward relative to the central conduit; and a slot carved within the vehicle component by the key of the housing. In one example of the system, the key extends radially outward further than the flange from the outer surfaces of the housing. The housing may be embedded within a passage of the vehicle component, the passage having an opening covered by the flange, and an inner diameter of the passage may be smaller than an outer diameter of a section of the housing forming the central conduit.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    increasing a temperature of a housing for a fastener above a melting temperature of an intake line of a vehicle;
    expanding a passage of the intake line by driving the housing into an opening of the passage; and
    forming a channel within an interior wall of the intake line and adjacent to the passage by melting the interior wall with a radial key of the housing while pressing the key against the interior wall, the key extending outward from an outer surface of the housing, where the channel includes only:
        a first section formed by pressing the key against the interior wall in an axial direction of the housing and not in a circumferential direction of the housing; and
        a second section formed by pressing the key against the interior wall in the circumferential direction and not in the axial direction.

2. The method of claim 1, further comprising closing the opening of the passage with a flange of the housing, the flange forming an aperture of a central conduit of the housing, the central conduit adapted to receive the fastener.

3. The method of claim 1, wherein expanding the passage includes pressing the outer surface of the housing against an inner surface of the passage.

4. The method of claim 1, wherein the first section is formed before the second section, and wherein forming the second section locks the key into the second section.

5. The method of claim 1, further comprising locking the housing to the intake line, and
    wherein the housing is not rotated as the first section is formed, and the housing is not removed from the intake line after the first section is formed and before locking the housing to the intake line.

6. The method of claim 1, further comprising locking the housing to the intake line, and
    wherein locking the housing to the intake line includes not moving the housing in the axial direction.

7. The method of claim 1, further comprising locking the housing to the intake line, and
    wherein locking the housing to the intake line includes positioning the key at an end of the second section.

8. The method of claim 7, wherein the second section is joined only with the first section and the channel is not joined to any other channels, and wherein the first and second sections is sealed from the passage by the outer surface of the housing.

9. The method of claim 7, wherein, while the key is positioned at the end of the second section, the key is not movable in the axial direction.

10. The method of claim 7, wherein the second section does not encircle an entire perimeter of the outer surface of the housing in the circumferential direction.

11. The method of claim 1, wherein increasing the temperature of the housing increases the temperature of the housing to above at least 550 Kelvin.

12. The method of claim 1, wherein forming the first section includes pressing the key of the housing against an exterior surface of the intake line to depress the exterior surface by a first length in the axial direction, the exterior surface forming the opening.

13. The method of claim 12, wherein the opening has an inner diameter smaller than a diameter of the outer surface of the housing.

14. The method of claim 1, further comprising fusing an inner surface of the passage of the vehicle component to the outer surface of the housing.

* * * * *